(12) United States Patent
Koster et al.

(10) Patent No.: US 7,437,392 B2
(45) Date of Patent: Oct. 14, 2008

(54) TRANSITIONING A FILTER FUNCTION OF A TWO-PORT LATTICE-FORM PLANAR WAVEGUIDE OPTICAL DELAY LINE CIRCUIT FILTER FROM A START FILTER FUNCTION TO A TARGET FILTER FUNCTION

(75) Inventors: Tonnis M. Koster, Wierden (NL); Bert J. Offrein, Schoenenberg (CH); Gian R. Salis, Pfaeffikon (CH)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 11/029,540

(22) Filed: Jan. 5, 2005

(65) Prior Publication Data
US 2005/0149593 A1 Jul. 7, 2005

(30) Foreign Application Priority Data
Jan. 7, 2004 (EP) .................................. 04405012

(51) Int. Cl.
*G06F 17/10* (2006.01)
*G06E 3/00* (2006.01)

(52) U.S. Cl. ...................................... 708/300; 708/816
(58) Field of Classification Search ................. 708/181, 708/300, 819, 831
See application file for complete search history.

(56) References Cited

U.S. PATENT DOCUMENTS

| 5,572,611 | A | * | 11/1996 | Jinguji et al. | 385/17 |
| 5,680,335 | A | * | 10/1997 | Ikeyama et al. | 708/319 |
| 5,867,293 | A | * | 2/1999 | Kotten | 398/149 |
| 7,209,670 | B2 | * | 4/2007 | Fludger et al. | 398/205 |

* cited by examiner

*Primary Examiner*—Chuong D Ngo
(74) *Attorney, Agent, or Firm*—Louis P. Herzberg

(57) ABSTRACT

Optically coherent, two-port, serially cascaded-form optical delay line circuits can realize arbitrary signal processing functions identical to those of FIR digital filters with complex filter coefficients whilst maintaining a maximum optical transmission characteristic of 100%. The invention provides an iterative process for transitioning in a step-wise manner a filter function of an optical delay line circuit filter from a start filter function to a target filter function. The invention also describes a dynamic gain equalizer incorporating an optical delay line circuit filter.

31 Claims, 8 Drawing Sheets

TRANSITIONING A FILTER FUNCTION OF A TWO-PORT LATTICE-FORM PLANAR WAVEGUIDE OPTICAL DELAY LINE CIRCUIT FILTER FROM A START FILTER FUNCTION TO A TARGET FILTER FUNCTION

FIELD OF THE INVENTION

The present invention relates to a method of transitioning a filter function of a two-port lattice-form planar waveguide optical delay line circuit filter from a start filter function to a target filter function and particularly, but not exclusively, to transitioning the filter function of a dynamically tunable optical gain equalizer for dynamically modifying the gain of an optical amplifier.

BACKGROUND OF THE INVENTION

Finite impulse response filters are widely known in digital signal processing. It is also known that optical delay line circuits comprising cascaded optical delay lines and directional couplers have filter characteristics similar to those of FIR digital filters. It has been shown that coherent, two-port, serially cascaded-form optical delay line circuits can realize arbitrary signal processing functions identical to those of FIR digital filters with complex filter coefficients whilst maintaining a maximum transmission characteristic of 100%.

A paper entitled "Synthesis of Coherent Two-Port Lattice-Form Optical Delay-Line Circuit", Journal of Lightwave Technology, volume 13, pages 73-82, 1995 authored by Kaname Jinguji (hereinafter referred to as "Jinguji") and corresponding U.S. Pat. No. 5,572,611 (hereinafter referred to as "the '611 patent") issued to Nippon Telegraph and Telephone Corporation present a method for synthesizing a coherent two-port lattice-form optical delay line circuit with phase shift controllers as illustrated in FIGS. 1 and 2. The presence of the phase shift controllers enables a tunable optical delay line filter to be implemented.

The optical delay-line circuit illustrated in FIG. 1 is a two-port circuit 10 having two input ports 11, 12 and two output ports 13, 14. The circuit 10 comprises two planar waveguides 15, 16 arranged between the input ports 11, 12 and the output ports 13, 14 in a pair-wise series of N+1 variable, directional couplers 17 and N variable delay lines 18. The variable directional couplers 17 have variable coupling rates and couple together the two planar waveguides 15, 16 of the N variable delay lines 18. The delay lines 18 each have a constant optical path length difference $\Delta_L$ between their waveguides 15, 16. Each delay line 18 has a phase shift controller 19 on at least one of its waveguides 15, 16 which can be controlled to provide a desired degree of phase difference $\phi$ between optical signals being transmitted through the respective waveguides 15, 16. The phase shift controllers 19 may be implemented as resistive heaters applied to a surface of a monolithic silica on silicon waveguide structure, (not shown) comprising the optical delay line circuit 10. The waveguides 15, 16 are formed to be single mode in operation.

FIG. 2 illustrates a variable directional coupler for the optical delay line circuit of FIG. 1. This comprises a symmetric Mach-Zehnder interferometer having two optical waveguides 15, 16 with equal optical path lengths, i.e. $\Delta_L=0$, or a small length difference that introduces an optical phase difference between the arms of up to $2\pi$ radians. The waveguides 15, 16 are coupled at each end by directional couplers 20 that preferably have a power coupling ratio of 3 dB. Each of the waveguides 15, 16 has a phase shift controller 21 which may be implemented as a resistive heater, although only one of the waveguides 15, 16 may be provided with a phase shift controller 21. The amplitude coupling ratio of the variable directional coupler is given by $\sin(\theta)$, where $\theta$ is the coupling coefficient angle. The phase shift controllers 21 allow the phase difference between the optical waveguides 15, 16 of the variable directional coupler 17 to be changed to the extent that the amplitude coupling ratio $\sin(\theta)$ of the variable directional coupler 17 can be varied through the range of 1 to 0 to −1.

The filter function of the optical delay line circuit filter is characterized by its wavelength dependent attenuation and chromatic dispersion. Depending on the design and the application of the filter, either the attenuation, the chromatic dispersion or both describe the filter function as used in this document.

The filter function (transfer function) coefficients of an optical delay line circuit filter 10 as illustrated by FIGS. 1 and 2 comprise the strengths of the directional couplers 17 and the phase delays of the delay lines 18. In order to set the filter to a desired filter function (spectral attenuation as a function of optical wavelength), the filter function is decomposed into its FIR coefficients from which the corresponding filter coefficients can be calculated according to Jinguji and the '611 patent. The filter coefficients comprise two sets of parameters, namely the coupling coefficient angles $\theta$ of the N+1 directional couplers 17 and the phase shift values $\phi$ of the N delay lines 18. Jinguji and the '611 patent teach a method of obtaining these sets of parameters from a set of recurrent equations. Each of the respective sets of parameters, once determined, is implemented through control of its respective set of phase shift controllers (resistive heaters) 19, 21. Thus, from the teaching of Jinguji and the '611 patent, it is in principle possible to provide an N stage serially, cascaded optical delay line circuit filter 10 with a desired filter function.

The solution for a desired filter function calculated in accordance with Jinguji and the '611 patent are for an ideal model of the optical delay line circuit filter 10. In Jinguji and the '611 patent, certain assumptions are made to the effect that all Mach-Zehnder interferometers (delay lines) have the same optical path length difference $\Delta_L$, that the amplification/attenuation in both waveguides of a delay line are equal and that the directional couplers are wavelength independent. In a real device, fabrication anomalies etc. will result in an optical delay circuit where all of these assumptions do not hold true. As a result, the filter coefficients calculated in accordance with Jinguji and the '611 patent will not actually define the desired filter function (target filter function) in a real optical delay line circuit filter 10 but define what can be considered as a start filter function. This will be apparent from a resultant, measured response for the optical delay line circuit 10 when the transfer coefficients calculated in accordance with Jinguji and the '611 patent are implemented.

An extended model incorporates fabrication anomalies and other properties of optical delay line circuit such as, among others, the wavelength dependency of the coupling ratio and the propagation loss difference in the waveguide arms of the delay lines and the variable directional couplers 15, 16. The extended model is used to find the optimum values for the coupling coefficient angles $\theta$ of the N+1 variable directional couplers 17 and the phase shift values $\phi$ of the N delay lines 18 by utilizing a non-linear optimization procedure. The parameters in the extended model that describe the fabrication anomalies and the important optical properties of the N+1 variable directional couplers 17 and N optical delay lines 18 are determined through a separate characterization procedure on the optical delay line circuit 10 that needs to be performed once before the device is set in operation.

An optical delay circuit line filter 10 as illustrated in FIGS. 1 and 2 can be employed, as aforesaid, in a dynamic gain equalizer but it can equally be employed in many other optical signal processing applications such as wavelength dispersion filters, frequency selection filters or polarization mode dispersion equalizers.

The ideal gain curve for an optical amplifier comprises a constant gain over a selected spectrum of optical wavelengths. However, as illustrated in FIG. 3, the gain curve 22 for a real Er doped optical amplifier does not provide constant gain over its spectral width. An equalizer can provide an attenuation curve 23 that seeks to flatten the Er doped amplifier gain characteristic 22 to provide a gain profile 24 tending towards the ideal flat gain profile for an optical amplifier. A problem encountered with optical amplifiers is that their gain profiles vary with time in response to various disparate influences such as operating temperature, input signal power, for example. These variations tend to occur over relatively long time periods in the order of minutes due to temperature variations or degradations, but also over smaller time-scales in the order of 10 ms due to network reconfigurations, rerouting or drop-out of signals at certain wavelengths.

An advantage of a dynamic gain equalizer employing an optical delay line circuit filter 10 as illustrated in FIGS. 1 and 2 is its tunability of the filter function (spectral attenuation) by adapting the filter coefficients in order to vary the spectral attenuation profile of the equalizer in response to changes in the optical amplifier gain profile over time or for any other reason. This can be achieved by linearly changing the filter coefficients from respective start values comprising the current or start filter function to respective target values representative of the desired or target filter function. However, if the filter coefficients (sets of parameters $\theta$ & $\phi$) are changed linearly from a start configuration to a target configuration, the attenuation at certain wavelengths during the transition may vary by more than the range spanned by the start and end filter coefficient configurations resulting in undesirable transition phenomena. These might include temporary strong attenuation at certain wavelengths resulting in network failure due to drop-out of said wavelength.

In addition, during the filter function transition, special care must be taken to ensure that the filter coefficients stay within their physically possible ranges. For example, the amplitude coupling ratio $\sin(\theta)$ of a directional coupler is dependent on the temperature range of that coupler's resistive heaters and many possible $\theta$ values for that coupler may not be implementable through its resistive heaters. This problem has been attended to previously by employing the periodicity of the filter function with the filter coefficients by means of adding or subtracting integer periods to those filter coefficients that extend outside their respective physical boundaries. However, such 'folding' of the filter coefficients cannot be achieved in a discreet step but must be varied smoothly thus encountering the same problem as aforesaid of the attenuation at certain wavelengths during the transition varying by more than the range spanned by the start and end filter coefficient configurations resulting in undesirable transition phenomena.

SUMMARY OF THE INVENTION

It is an aspect of the present invention to provide a method of transitioning a filter function of a two-port lattice-form planar waveguide optical delay line circuit filter in a manner that obviates or mitigates problems associated with known methods. It is another aspect of the present invention to provide a method of transitioning a filter function of a two-port lattice-form planar waveguide optical delay line circuit filter that enables a controlled transition of the filter function between a start filter function and a target filter function. It is a further aspect of the present invention to provide a method of transitioning the filter coefficients of a two-port lattice-form planar waveguide optical delay line circuit filter to a new set of filter coefficients where the filter function is kept constant within a predefined range.

According to the first aspect of the invention, there is provided a method of transitioning a filter function of an optical delay line circuit filter from a start filter function to a target filter function, characterized in that it comprises the steps of:

a) determining start filter coefficients defining the start filter function for said optical delay line circuit filter;

(b) interpolating the differences in values of said start filter function and said target filter function over a spectral range of said optical filter to establish m−1 intermediate filter functions, where m is an integer and m≧2;

c) determining best fit filter coefficients for a first intermediate filter function by performing an optimization process on filter coefficients using the start filter function coefficients to obtain the best fit solution to said first intermediate filter function filter coefficients; and d) iteratively repeating step c) to obtain best fit filter coefficients for the successive intermediate filter functions if any and, advantageously, for the target filter function, utilizing in each iteration the best fit filter coefficients obtained from the preceding optimization step thereby resulting in a best fit solution to the filter coefficients of the target filter function of the optical filter.

According to a second aspect of the invention, there is provided a method of transitioning a filter function of a dynamic gain equalizer having an optical delay line circuit from a start filter function to a target filter function, characterized in that it comprises the steps of: a) determining start filter coefficients defining the start filter function for said optical delay line circuit of said equalizer, b) interpolating differences in values of said start filter function and said target filter function over a spectral range of said dynamic gain equalizer to establish m−1 intermediate filter functions, where m is an integer and m≧2; c) determining best fit filter coefficients for a first intermediate filter function by performing an optimization process on filter coefficients using the start filter function coefficients to obtain the best fit solution to said first intermediate filter function; and d) iteratively repeating step c) to obtain best fit filter coefficients for any successive intermediate filter function and, advantageously, the target filter function, utilizing in each iteration the best fit filter coefficients obtained from the preceding optimization step thereby resulting in a best fit solution to the filter coefficients of the target filter function of the gain equalizer.

The present invention is applicable to optical delay line circuits as described in the 611 patent and can also be applied to any other implementation of finite impulse response (FIR) based tunable filter.

BRIEF DESCRIPTION OF THE DRAWINGS

The above and other aspects, features, and advantages of the present invention will become more apparent from the following detailed description when taken in conjunction with the accompanying drawings, in which.

DESCRIPTION OF THE INVENTION

Figure 1:
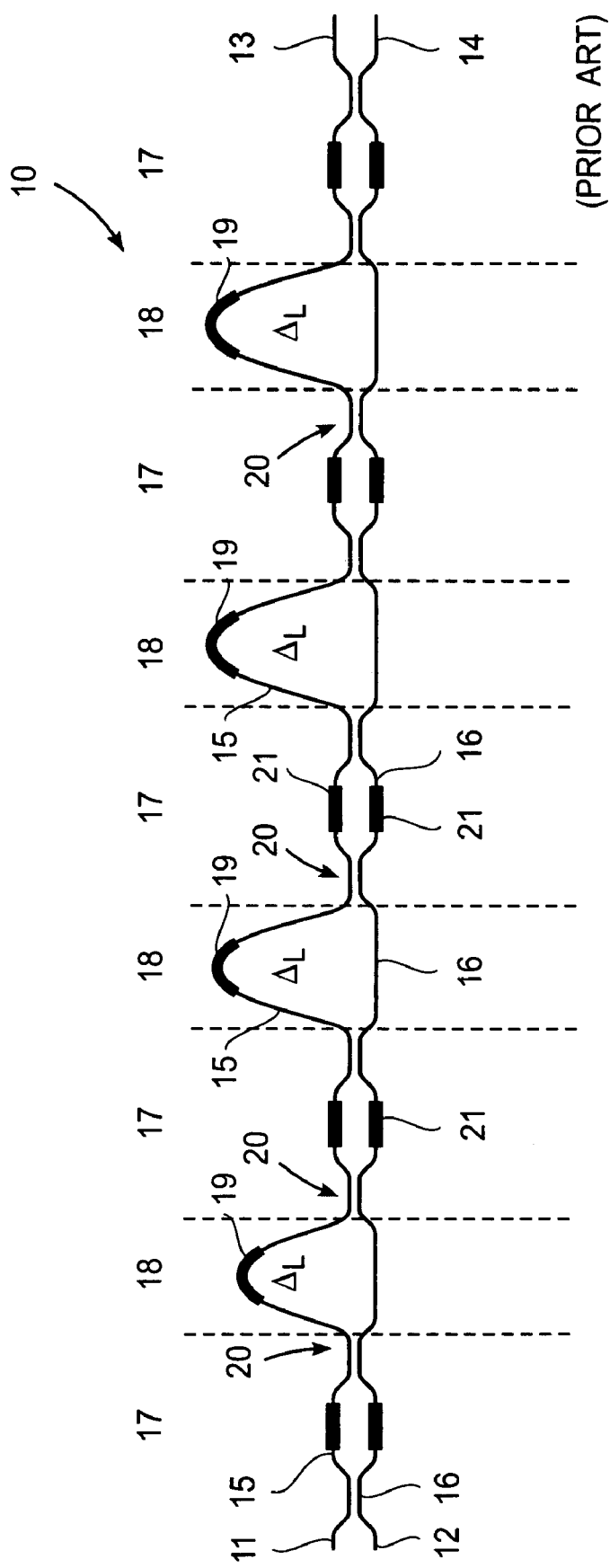
FIG. 1 is a schematic circuit diagram of a known planar waveguide optical delay line circuit filter as taught by Jinguji and the '611 patent.

The present invention provides methods of transitioning a filter function of a two-port lattice-form planar waveguide optical delay line circuit filter in a manner that obviates or mitigates problems associated with previously known methods. The present invention also provides methods of transitioning a filter function of a two-port lattice-form planar waveguide optical delay line circuit filter that enables a controlled transition of the filter function between a start filter function and a target filter function. The present invention further provides methods of transitioning the filter coefficients of a two-port lattice-form planar waveguide optical delay line circuit filter to a new set of filter coefficients where the filter function is kept constant within a predefined range.

According to an embodiment of the invention, there is provided a method of transitioning a filter function of an optical delay line circuit filter from a start filter function to a target filter function, characterized in that it comprises the steps of:

a) determining start filter coefficients defining the start filter function for said optical delay line circuit filter;
b) interpolating the differences in values of said start filter function and said target filter function over a spectral range of said optical filter to establish m−1 intermediate filter functions, where m is an integer and m≧2;
c) determining best fit filter coefficients for a first intermediate filter function by performing an optimization process on filter coefficients using the start filter function coefficients to obtain the best fit solution to said first intermediate filter function filter coefficients; and
d) iteratively repeating step c) to obtain best fit filter coefficients for the successive intermediate filter functions if any and, advantageously, for the target filter function, utilizing in each iteration the best fit filter coefficients obtained from the preceding optimization step thereby resulting in a best fit solution to the filter coefficients of the target filter function of the optical filter.

Advantageously, the differences between said start filter function and said target filter function to establish respective m−1 intermediate filter functions are interpolated linearly. Advantageously, the optimization process of step c) comprises, utilizing a non-linear least squares estimation function to determine a best fit solution. The optimization process may comprise a Gauss-Newton or Levenberg-Marquardt algorithm. Advantageously, the method includes a step of maintaining optimized filter coefficients within their respective physical boundaries which may comprise adding a penalty function to the non-linear least squares estimation function.

Alternatively, or in addition, the method of maintaining optimized filter coefficients within their respective physical boundaries comprise a slide back process to place the value of a filter coefficient at the value of a boundary or at a value within the boundaries of the physical range of that that filter coefficient has crossed. Advantageously, the slide back process is applied to only delay line filter coefficients.

The filter function of the optical delay line circuit filter is characterized by its wavelength dependent attenuation and chromatic dispersion. Depending on the design and the application of the filter, either the attenuation, the chromatic dispersion or both describe the filter function as used in this document.

According to a second example embodiment of the invention, there is provided a method of transitioning a filter function of a dynamic gain equalizer having an optical delay line circuit from a start filter function to a target filter function, characterized in that it comprises the steps of:

a) determining start filter coefficients defining the start filter function for said optical delay line circuit of said equalizer,
b) interpolating differences in values of said start filter function and said target filter function over a spectral range of said dynamic gain equalizer to establish m−1 intermediate filter functions, where m is an integer and m≧2;
c) determining best fit filter coefficients for a first intermediate filter function by performing an optimization process on filter coefficients using the start filter function coefficients to obtain the best fit solution to said first intermediate filter function; and
d) iteratively repeating step c) to obtain best fit filter coefficients for any successive intermediate filter function and, advantageously, the target filter function, utilizing in each iteration the best fit filter coefficients obtained from the preceding optimization step thereby resulting in a best fit solution to the filter coefficients of the target filter function of the gain equalizer.

Figure 2:
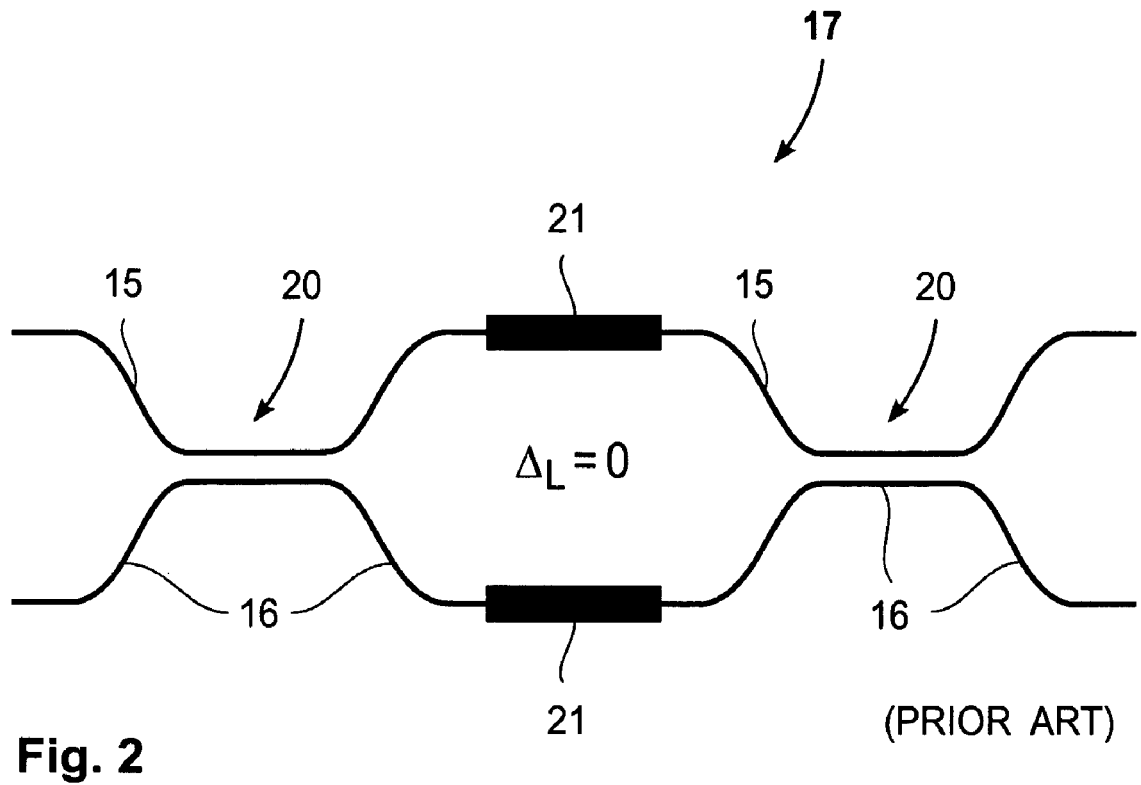
FIG. 2 is a schematic circuit, diagram of a directional coupler for the optical delay line circuit filter of FIG. 1.
Figure 3:
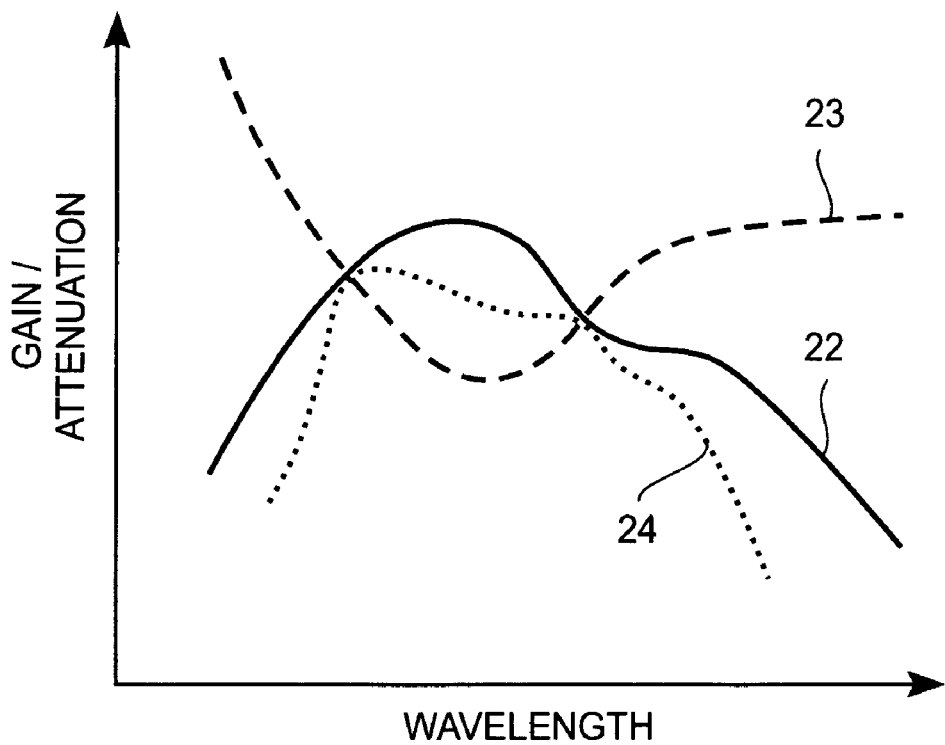
FIG. 3 is a graph illustrating a gain profile for an Er doped optical amplifier and a compensating attenuation profile of a gain equalizer.
Figure 4:
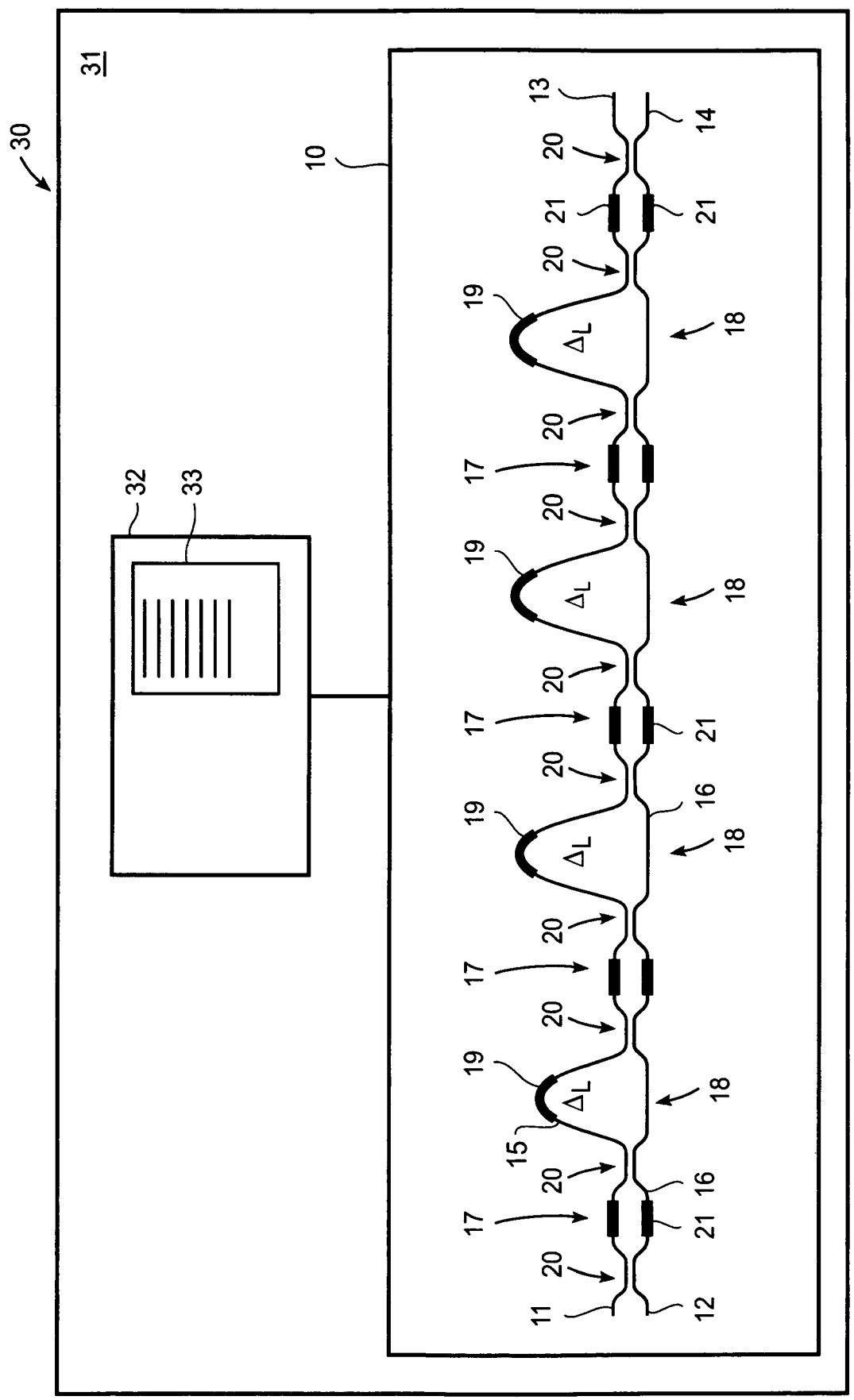
FIG. 4 is a schematic circuit diagram of an optical signal processing system in accordance with the invention incorporating an optical delay line circuit filter of FIG. 1.

Referring to FIG. 4, the present invention provides an optical signal processing system 30 incorporating an optical delay line circuit filter 10 as taught by Jinguji and the '611 patent and as illustrated by FIGS. 1 and 2. In an advantageous arrangement of the embodiment of the invention as illustrated by FIG. 4, the processing system 30 comprises a dynamic gain equalizer 31. However, the processing system 30 of the present invention could equally well comprise other optical processing systems such as a wavelength dispersion filter or the like. The embodiment of the invention as depicted by FIG. 4 uses like numerals as employed in FIGS. 1 and 2 for like parts.

The filter function of a dynamic gain equalizer 31 is specified by its attenuation at each wavelength of its operating spectrum. The filter coefficients (sets of parameters θ & φ) to define a desired filter function for the optical delay line circuit filter 10 can be calculated in accordance with Jinguji and the '611 patent. These parameters are stored in a memory table 33 of a control processor 32 of the gain equalizer 31 and are employed in the control of the phase shift controllers 19, 21 of the optical delay line circuit filter 10 to implement said filter function. However, there is no unique solution to the recurrent equations taught by Jinguji and the '611 patent. In fact, there are $2^N$ solutions for a desired filter function. Consequently, any one of the $2^N$ solutions can be selected to implement the filter function.

Also, the $2^N$ solutions for a desired filter function calculated in accordance with Jinguji and the '611 patent are for an ideal model of the optical delay line circuit filter 10. In Jinguji and the '611 patent, certain assumptions are made to the effect that all Mach-Zehnder interferometers (delay lines) have the same optical path length difference $\Delta_L$, that the amplification/attenuation in both waveguides of a delay line are equal and that the directional couplers are wavelength independent. In a real device, fabrication anomalies etc. will result in an optical delay circuit where all of these assumptions do not hold true. As a result, the filter coefficients calculated in accordance with Jinguji and the '611 patent will not actually define the desired filter function (target filter function) in a real optical delay line circuit filter 10 but define what can be considered as a start filter function. This will be apparent from a resultant, measured gain attenuation profile for the dynamic gain equalizer 31 when the transfer coefficients calculated in accordance with Jinguji and the '611 patent are implemented as an optional initialization step (step 40, FIG. 5) of the method according to the invention. It will then be necessary to transition the measured (start) filter function to the desired (target) filter function.

As an alternative optional initialization step 40 of initializing the dynamic gain equalizer 31, a set of arbitrary filter coefficients are implemented which define an arbitrary, start filter function. Similarly to the above, this arbitrary, start filter function will then have to be transitioned to a desired (target) filter function.

During operation, the gain profile of an optical amplifier changes with time. Consequently, it is desirable to change an attenuation profile of a gain equalizer to compensate for changes in the amplifier's gain profile by transitioning its currently implemented filter function to a desired (target) filter function that better compensates the changed gain profile of the amplifier.

In the following description of a method in accordance with the invention, reference will be made to a start filter function and a target filter function. The start filter function comprises the filter function being implemented by the dynamic gain equalizer 31 whether that filter function is one resulting from the ideal filter coefficients being calculated in accordance with Jinguji and the '611 patent for a desired filter function, selection of an initial arbitrary start filter function or a currently implemented filter function. The target filter function comprises the filter function to which it is desired to transition the start filter function.

As aforesaid, the filter function of a dynamic gain equalizer is specified by its attenuation at each wavelength of its operating spectrum. Beginning with a start filter function which is already known or can be determined by measuring the current attenuation profile of the dynamic gain equalizer 31 or modeled from the parameters stored in the control processor table 33 and wishing to transition it to a target filter function, the method of the invention comprises as a first step (step 42, FIG. 5) of dividing the transition of the filter function of the gain equalizer 31 into m small steps. As illustrated by the gain equalizer attenuation profile graph of FIG. 6, the m small steps comprise m−1 intermediate filter functions $51(a \ldots i)$ being interpolated between the start filter function (denoted by broken line 50 in FIG. 6) and the target filter function (denoted by broken line 52 in FIG. 6), where m is an integer and is greater or equal to 2. In the example illustrated by FIG. 6, m=10 resulting in nine intermediate interpolated filter functions $51(a \ldots i)$ between the start filter function 50 and the target filter function 52. At any given wavelength in the gain equalizer's operating spectrum, the intermediate interpolated filter functions 51 are determined by a step-wise interpolation between respective attenuations of the start and target filter functions 50, 52.

As a second step (step 44, FIG. 5), the filter coefficients of the first intermediate interpolated filter function 51a are optimized by employing the filter coefficients of the start filter function 50 as 'guess' parameters. In such a process, the filter coefficients of the start filter function and the attenuation values of the first intermediate filter function 51a are inputs and the filter coefficients of the best fit first intermediate filter function is an output. The optimization process cormprises a non-linear minimization of an error function defined as the sum over squared differences between the attenuation values of the first intermediate interpolated filter function 51a and the filter function obtained with the filter coefficients that are to be optimized. The Levenberg-Marquardt algorithm is one example of a suitable non-linear least squares estimation process for use in the optimization step 44 to determine the best fit values for the filter coefficients of the first intermediate interpolated filter function 51a. In the third (step 46, FIG. 5) and subsequent steps, the best fit values for the filter coefficients of the next intermediate interpolated filter function $51(b \ldots i)$ are determined using the previously obtained best fit filter coefficients as 'guess' parameters and the pre-determined attenuation values of the next intermediate interpolated filter function for that optimization step 46. This iterative process yields a series of m sets of best fit filter coefficients. These are applied to the filter circuit in a step-wise manner to transition it from its start filter function 50 to its target filter function 52. The m steps have to be chosen small enough such that differences between subsequent intermediate filter functions are small. For instance, if the optical filter is configured as a dynamic gain equalizer, the number of steps m may be chosen such that the difference in attenuation of subsequent intermediate filter functions is smaller than 1 dB at all relevant wavelengths. If the steps m are chosen to be sufficiently small, then it is possible to achieve a controlled change of the filter coefficients of the start filter function 50 to the target filter function 52 in a stepwise continuous fashion without encountering undesirable transition phenomena (48, FIG. 5).

In each step of the transition of the start filter function 50 to the target filter function 52, the optimization process must find filter coefficients that lie within the physical boundaries of the optical delay line circuit filter 10. Such boundaries are limited, for example, by the maximum power that can be applied to a resistive (Cr) heater 19, 21 that controls a phase shift controller 19, 21 and thus a phase of a delay line 17 or a coupling strength of a directional coupler 18. A known method to accommodate such constraints is to introduce a penalty function as discussed in the publication entitled "Practical Methods of Optimization", $2^{nd}$ edition authored by R. Fletcher and published by John Wiley & Sons, 1987. The method to constrain the optimized filter coefficients to lie within their physical boundaries using a penalty function comprises choosing a penalty function to be equal to zero or a constant for values falling within their physical boundaries and to increase them by some value when outside of their boundaries. The increase imposed by the penalty function may be chosen to be quadratic in the distance of the filter coefficient that is outside of its boundary from its respective boundary. The penalty function increases are added to the least square error function as part of the optimization steps 44 and 46. With this approach, solutions with filter coefficients outside their physical boundaries pay a penalty, although they are not completely avoided.

An enhancement to the use of a penalty function to constrain filter coefficients within their physical boundaries is to define upper and lower boundaries lying within (on the inner sides of) the physical boundary ranges for said coefficients and to utilise these inner boundaries as the trigger values for imposition of the penalty function. In this way, solutions pay an increasing penalty when their filter coefficients approach their physical boundaries from an inner side of their physical boundary ranges and not only when they have crossed the boundaries. By carefully selecting the upper and lower inner boundary values and the strength of the penalty function as it is applied outside of the inner boundaries, it is possible to maintain optimised filter coefficients within their physical boundaries through the whole of the filter function transfer process. Since the filter functions are periodic in each filter coefficient, it is sufficient to realize an optical filter with a tuning range for each filter coefficient that spans at least one period. For example, the physical boundaries of a filter coefficient that is implemented as electrical power applied to a resistive heater on one side of a Mach Zehnder interferometer are given by the phase difference of the Mach Zehnder interferometer at zero power applied to the heater (lower physical boundary) and the phase difference of the Mach Zehnder interferometer at maximum allowed power (upper physical boundary). The phase difference between upper and lower physical boundary has to be $(1+q)2\pi$, where $2\pi$ is the period of the filter coefficient and $q>0$. Ideally, the inner boundaries within which the penaltiy function is chosen to be zero or constant span a range which is larger than or equal to $2\pi$. The penalty function is chosen to increase in the ranges between the lower physical boundary and the lower inner boundary, as well as in the range between the upper inner boundary and the upper physical boundary, which together span a range that is smaller than or equal to $2\pi q$.

Figure 5:
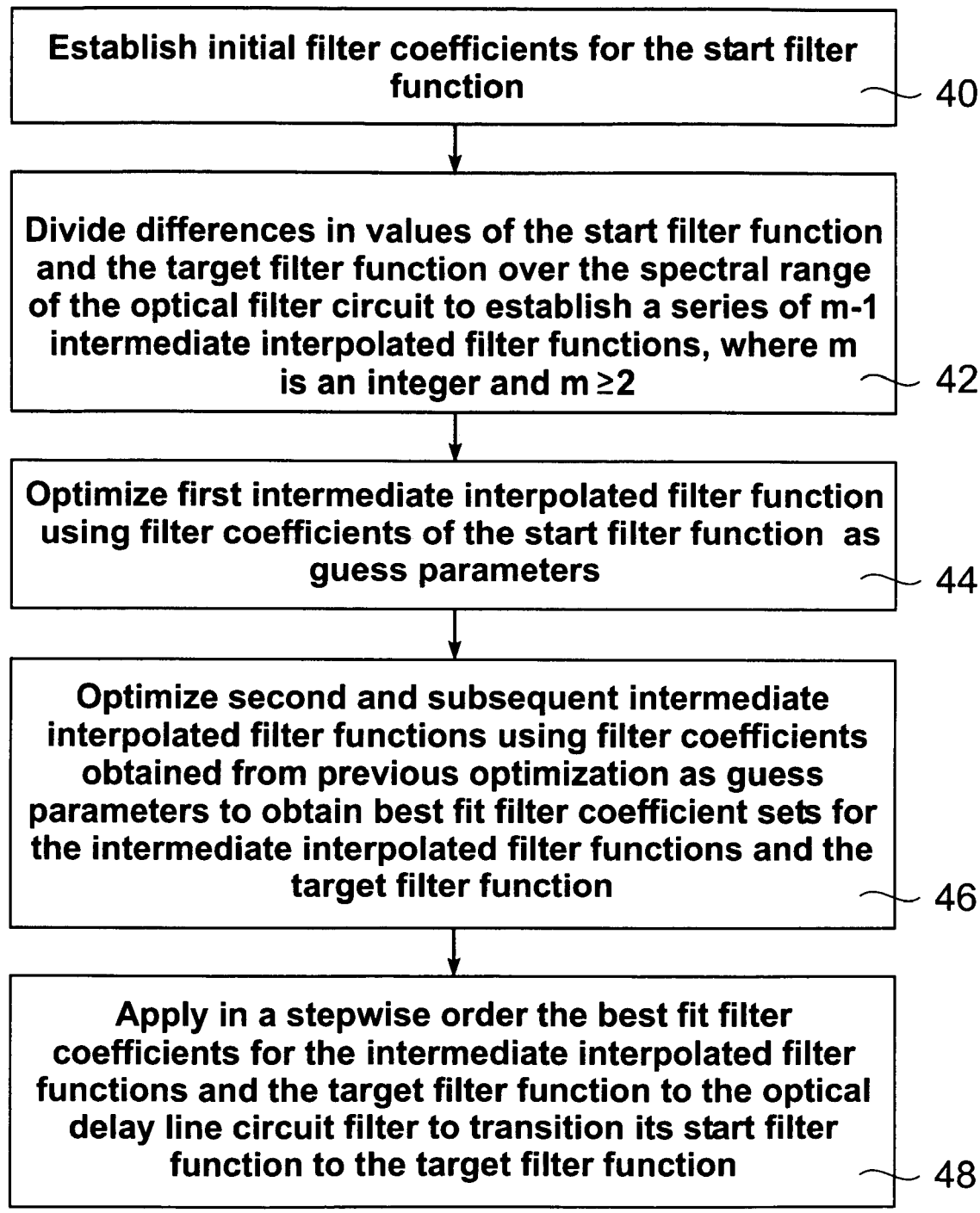
FIG. 5 is a flow diagram illustrating the steps of a method in accordance with the invention.
Figure 6:
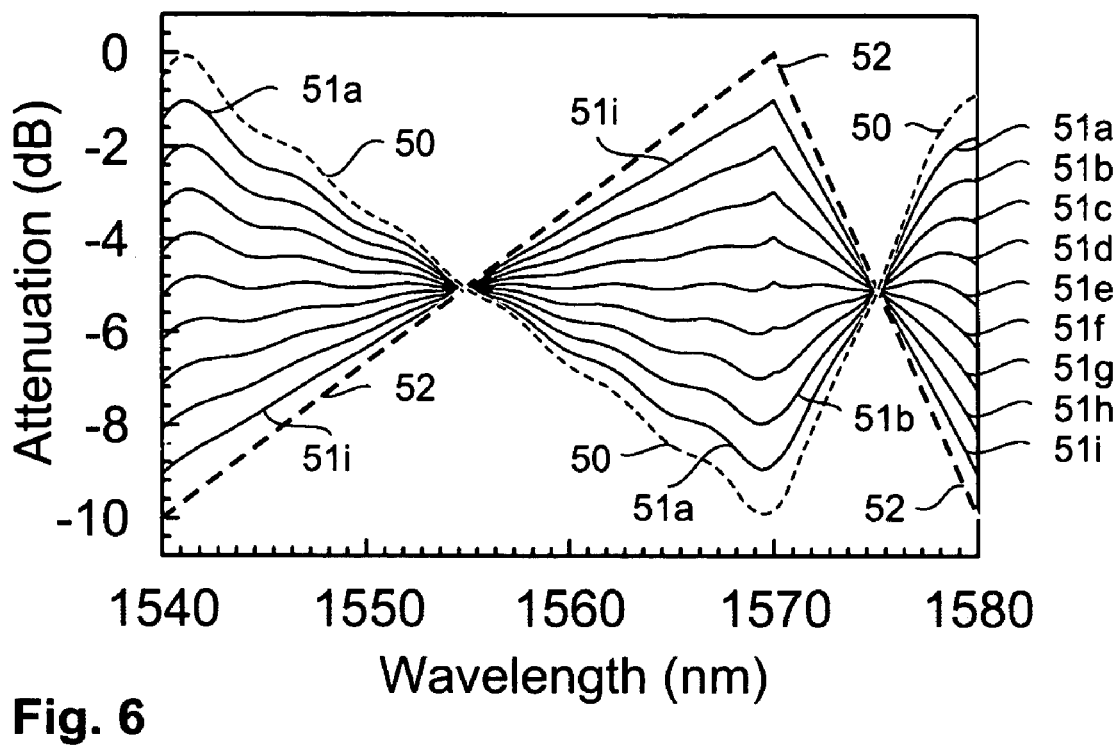
FIG. 6 is a graph illustrating intermediate interpolated filter functions for effecting a transition between a start filter function and a target filter function of the dynamic gain equalizer.
Figure 7:
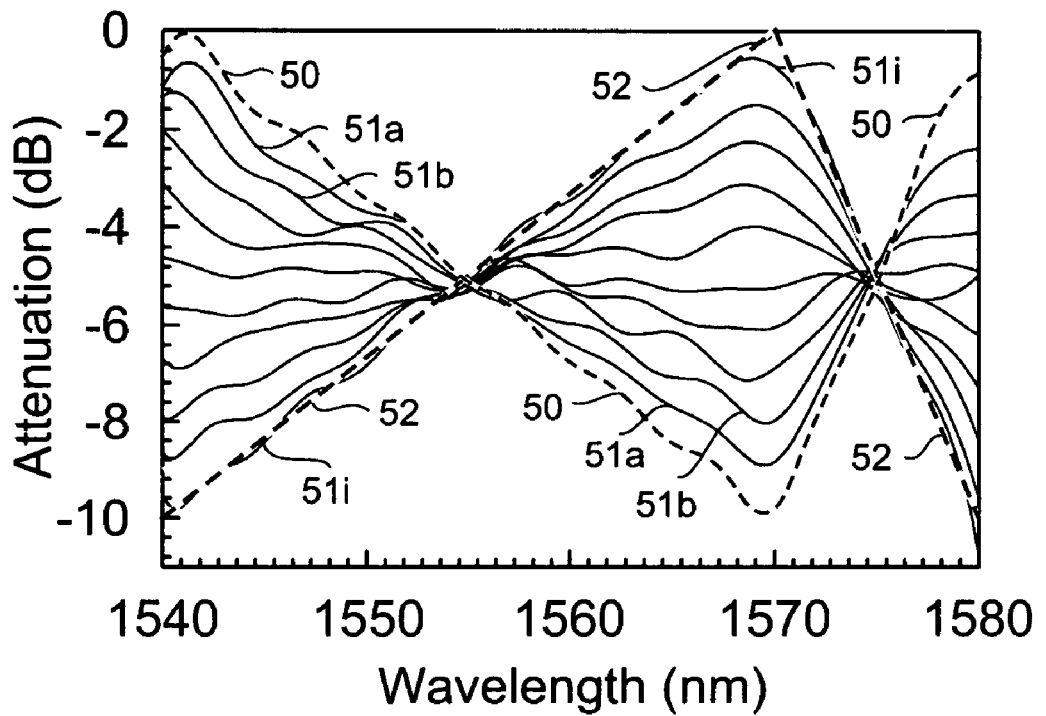
FIG. 7 is a graph illustrating the calculated gain equalizer 31 attenuation profiles using the filter coefficients resulting from the stepwise fitting of the intermediate interpolated filter curves 51 of FIG. 6 in accordance with the method illustrated by the flow diagram of FIG. 5 employing a penalty function for filter coefficients extending beyond set back inner physical boundaries of the filter coefficients.

FIG. 7 is a graph illustrating the calculated gain equalizer attenuation profiles 51 using the filter coefficients resulting from the stepwise fitting of the intermediate interpolated filter curves of FIG. 6 in accordance with the method illustrated by the flow diagram of FIG. 5 employing a penalty function for filter coefficients extending beyond set back inner physical boundaries of the filter coefficients. In this illustration, the upper inner boundaries of the filter coefficients are placed $0.2\pi$ inside of the physical boundaries with the exception of the lower inner boundaries of the directional couplers which are not set back, i.e. the set back=zero for this exception.

Figure 8:
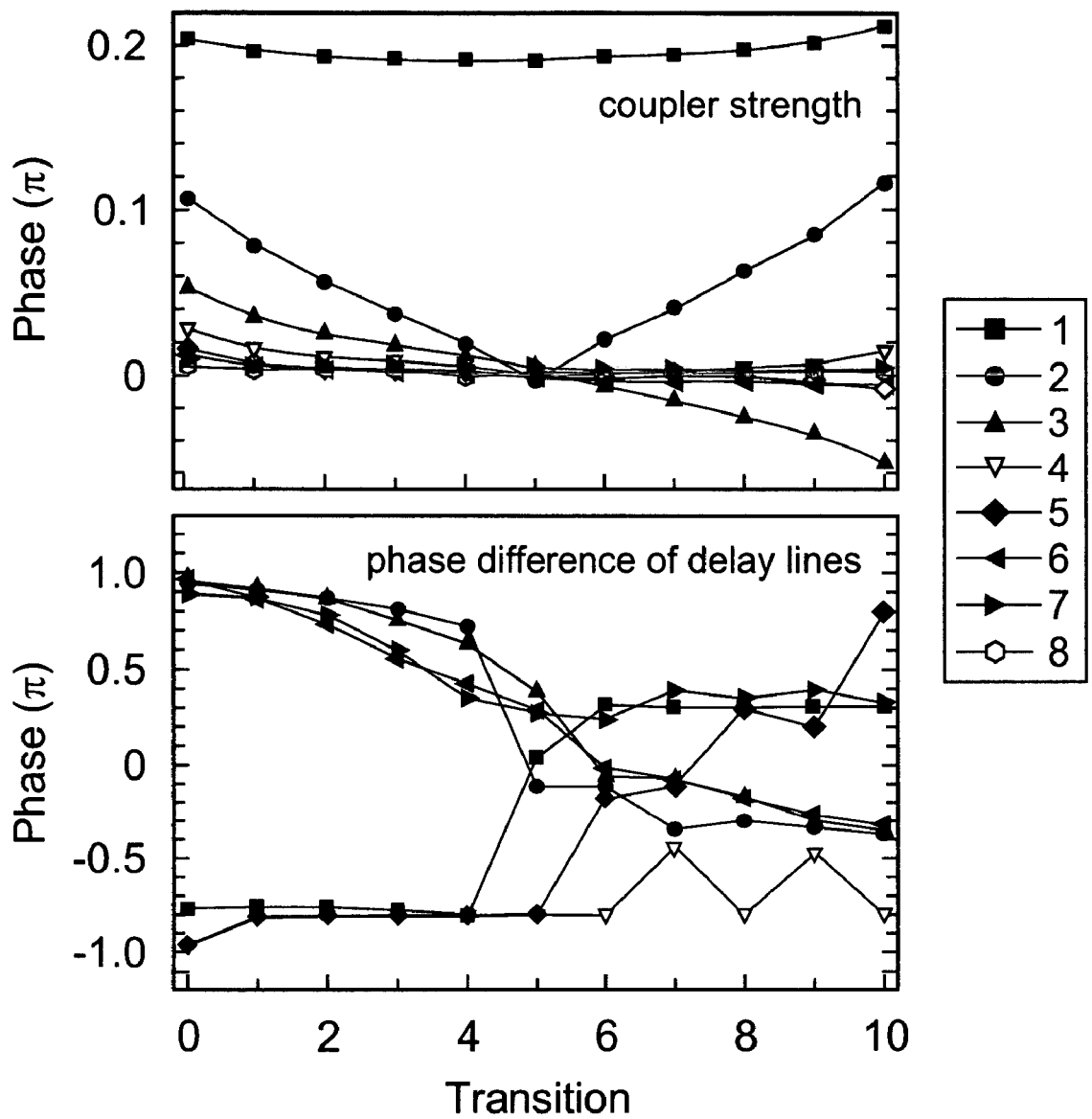
FIG. 8 is a graph illustrating the filter coefficients calculated by the stepwise fitting of the intermediate interpolated filter curves of FIG. 6 in accordance with the method illustrated by the flow diagram of FIG. 5 employing a penalty function for filter coefficients extending beyond set back inner physical boundaries of the filter coefficients.

FIG. 8 is a graph illustrating the filter coefficients calculated by the stepwise fitting of the intermediate interpolated filter curves of FIG. 6 using the before described method. In FIG. 8, the horizontal axis describes the transition step, where 0 stands for the start filter function 50, 1 . . . 9 for the intermediate filter functions 51($a$ . . . $i$), and 10 for the target filter function 52. The vertical axis labels the values of the filter coefficients for the coupler strength of couplers 1 . . . 8 (upper chart) and the phases of delay lines 1 . . . 7 (lower chart).

As an additional means to keep the filter coefficients within their physical boundaries, in each optimization step of an intermediate interpolated filter function 51, out of boundary coefficients are set back at the value of the crossed boundary. If no or only a small penalty function is employed in the optimization process, some filter coefficients may 'stick' to the boundary, which leads to a poor optimization of the intermediate interpolated filter function 51. In such cases, an auxiliary method step is introduced as described below.

Because any given filter function of a gain equalizer 31 can be realized with many different sets of filter coefficients, the filter system is over-determined. This provides a degree of freedom to choose one of the 2N+1 delay line and directional coupler coefficients at will, and adapt the remaining 2N coefficients during the optimization process. This auxiliary step comprises sliding back filter coefficients into their respective physical ranges when they cross or 'stick' to a respective physical boundary. It has been found that this process provides better results when the filter coefficient to be slid back comprises a delay line phase coefficient. In the case of directional coupler coefficient, since these are naturally limited to a range between 0 and +/−1, out of boundary values can be prevented by circuit design constraints in contrast with the periodic delay line phases which are not similarly limited.

Figure 9:
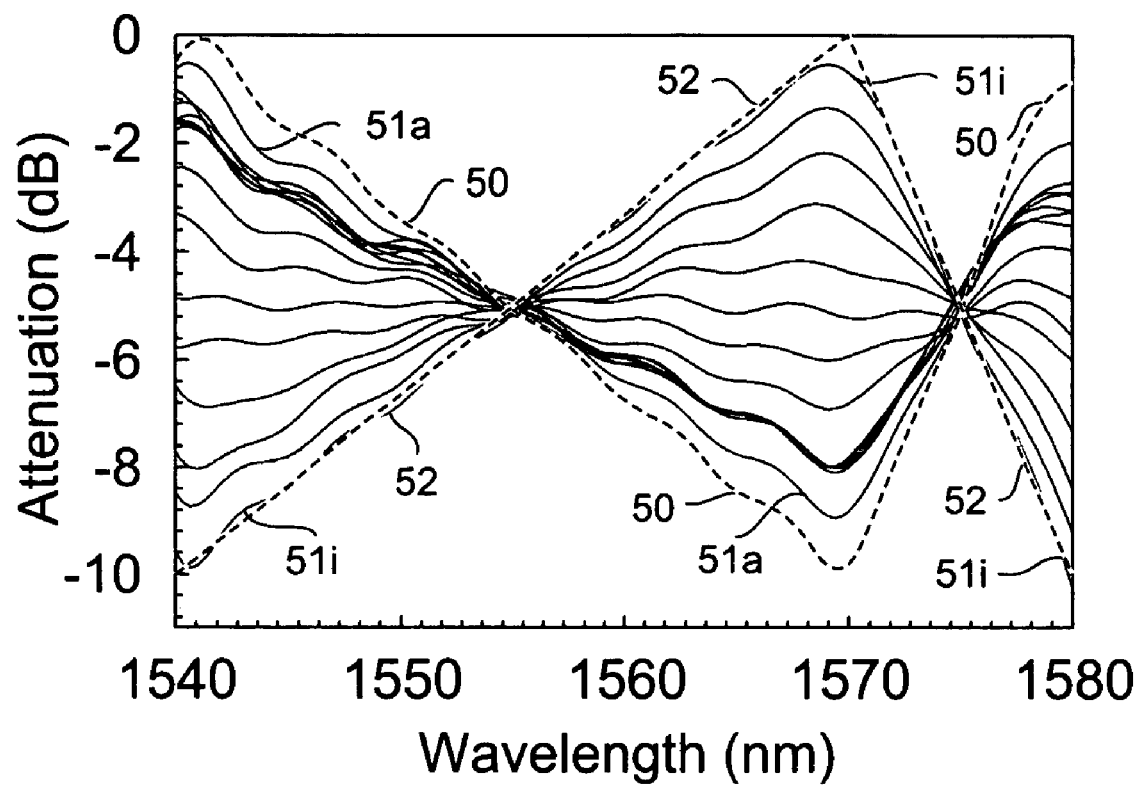
FIG. 9 is a graph illustrating the calculated gain equalizer 31 attenuation profiles using the filter coefficients resulting from the stepwise fitting of the intermediate interpolated filter curves 51 of FIG. 6 in accordance with the method illustrated by the flow diagram of FIG. 5 and employing a filter coefficient sliding process without the use of a penalty function.
Figure 10:
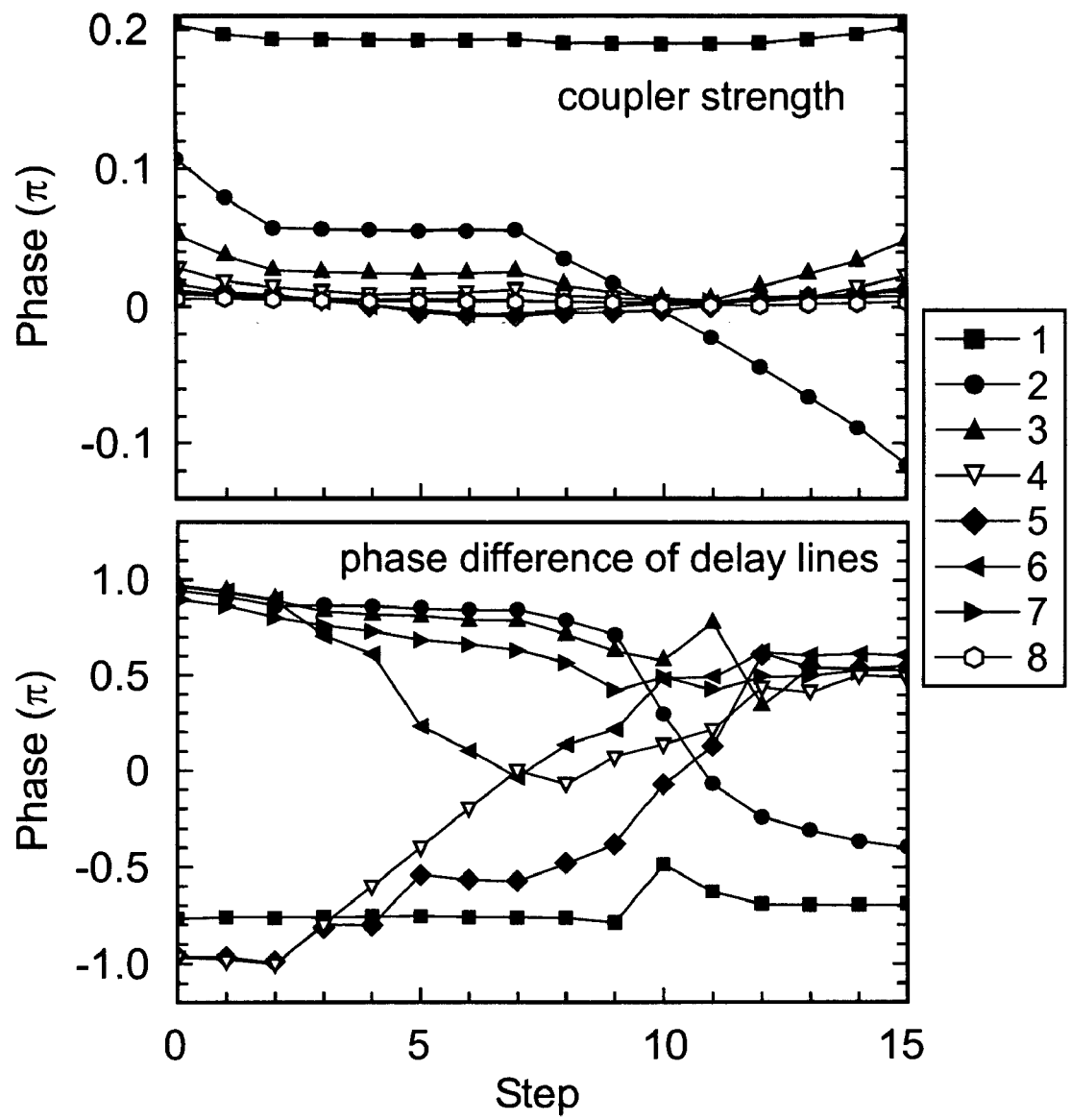
FIG. 10 is a graph illustrating the filter coefficients calculated by the stepwise fitting of the intermediate interpolated filter curves of FIG. 6 in accordance with the method illustrated by the flow diagram of FIG. 5 and employing a filter coefficient sliding process without the use of a penalty function.

The auxiliary method step comprises a check at each optimization process step of whether filter coefficients are still within their boundary ranges or the inner boundaries where such are employed. If not, then a sequence of optimization steps is effected which slides the affected filter coefficient back into its range. In each of these steps, the constrained optimization is performed for 2N free filter coefficients and one fixed filter coefficient. This process leads to a series of filter coefficient sets corresponding to the same filter function. A subsequent setting of the filter coefficients through these values leads to a sliding back of the affected filter coefficient within its physical range. A total sliding distance of $\pi$ was found to be effective to detach a stuck filter coefficient from its boundary. FIG. 9 is a graph illustrating the calculated gain equalizer 31 attenuation profiles using the filter coefficients resulting from the stepwise fitting of the intermediate interpolated filter curves 51 of FIG. 6 in accordance with the method illustrated by the flow diagram of FIG. 5 and employing a filter coefficient sliding process without the use of a penalty function. In this example, the sliding process was employed between the second and third optimization steps 44, 46. FIG. 10 is a graph illustrating the filter coefficients calculated by the stepwise fitting of the intermediate interpolated filter curves of FIG. 6 in accordance with the method illustrated by the flow diagram of FIG. 5 and employing a filter coefficient sliding process without the use of a penalty function. In this example, a fourth delay line 18 has its phase slid back by an amount of $+\pi$ during the third to seventh optimization steps.

The present invention provides a method of controlling the transition of a filter function of a two-port optical delay line circuit filter from a start filter function to a target filter function using a stepwise iterative interpolation process in concert with a non-linear least squares optimization process. The method may also include the use of a penalty function or a slide back process in association with said optimization process to constrain calculated filter coefficients to their physically possible ranges.

The invention claimed is:

1. A method comprising transitioning a filter function of an optical delay line circuit filter from a start filter function to a target filter function, the step of transitioning comprises the steps of:
   (a) determining start filter coefficients defining a start filter function for said optical delay line circuit filter;
   (b) interpolating differences in values of said start filter function and said target filter function over the optical filter's spectral range to establish m−1 intermediate filter functions, where m is an integer and m≧=2;
   (c) determining best fit filter coefficients for a first intermediate filter function by performing an optimization process on filter coefficients using the start filter function coefficients to obtain the best fit solution to said first intermediate filter function; and
   (d) iteratively repeating step (c) to obtain best fit filter coefficients for any successive intermediate filter function utilizing in each iteration the best fit filter coefficients obtained from the preceding optimization step thereby resulting in a best fit solution to the filter coefficients of the target filter function of the optical filter.

2. A method as claimed in claim 1, further comprising the step of applying to the optical filter the best fit filter coefficients obtained for the intermediate interpolated filter functions and the target filter function in a step-wise order to effect transition from said start filter function to said target filter function.

3. A method as claimed in claim 1, wherein the values used as a basis for establishing the interpolated intermediate functions comprise start filter and target filter function attenuation values or chromatic dispersion values or a combination of both.

4. A method as claimed in claim 1, wherein step (a) comprises a selection of an arbitrary set of filter coefficients defining an arbitrary start filter function.

5. A method as claimed in claim 1, wherein step (a) comprises a set of filter coefficients defining a currently implemented filter function in an operating optical delay line circuit filter.

6. A method as claimed in claim 1, wherein step (a) comprises calculating the start filter function filter coefficients from a set of recurrent equations.

7. A method as claimed in claim 1, wherein the filter coefficients of the intermediate and target filter functions of steps (b) and (c) are derived from a measured frequency response curve of an operating optical delay line circuit filter or from a mathematical model of the optical delay line circuit filter.

8. A method as claimed in claim 1, wherein the differences between values of said start filter function and said target filter function at any given wavelength in the filter's spectral range are interpolated linearly to establish the m−1 intermediate filter functions.

9. A method as claimed in claim 1, wherein the optimization of step (c) comprises utilizing a non-linear least squares estimation function to determine a best fit solution.

10. A method as claimed in claim 9, wherein the optimization process comprises a Gauss-Newton or Levenberg-Marquardt algorithm.

11. A method as claimed in claim 9, further comprising maintaining optimized filter coefficients within their respective physical boundaries.

12. A method as claimed in claim 11, wherein the step of maintaining optimized filter coefficients within their respective physical boundaries comprises adding a penalty function to the non-linear least squares estimation function.

13. A method as claimed in claim 12, wherein the penalty function is chosen to have a zero or constant value for filter coefficients residing within their respective physical ranges or within pre-defined inner boundaries of said respective physical ranges and an increased value for filter coefficients outside said ranges.

14. A method as claimed in claim 11, wherein the step of maintaining optimized filter coefficients within their respective physical boundaries comprises a slide back process to place the value of a filter coefficient at the value of a boundary of the physical range or at a value in between the boundaries of the physical range of that that filter coefficient has crossed.

15. A method as claimed in claim 14, wherein the slide back process is applied to only delay line filter coefficients.

16. A method comprising transitioning a filter function of a dynamic gain equalizer having an optical delay line circuit from a start filter function to a target filter function, wherein the step of transitioning comprises the steps of:
   (a) determining start filter coefficients defining a start filter function for said optical delay line circuit of said equalizer;
   (b) interpolating differences in values of said start filter function and said target filter function over the dynamic gain equalizer's spectral range to establish m−1 intermediate filter functions, where m is an integer and m=2;
   (c) determining best fit filter coefficients for a first intermediate filter function by performing an optimization process on filter coefficients using the start filter function coefficients to obtain the best fit solution to said first intermediate filter function filter coefficients; and
   (d) iteratively repeating step (c) to obtain best fit filter coefficients for any successive intermediate filter function utilizing in each iteration the best fit filter coefficients obtained from the preceding optimization step thereby resulting in a best fit solution to the filter coefficients of the target filter function of the gain equalizer.

17. A method as claimed in claim 16, further comprising the step of applying to the optical delay line circuit of the dynamic gain equalizer the best fit filter coefficients obtained for the intermediate interpolated filter functions and the target filter function in a step-wise order to effect transition from said start filter function to said target filter function.

18. A method as claimed in claim 16, wherein the values that are used as a basis for establishing the interpolated intermediate functions comprise start filter and target filter function attenuation values or chromatic dispersion values or a combination of both.

19. A method as claimed in claim 16, wherein the number of steps m is chosen such that the difference in attenuation of subsequent intermediate filter functions is smaller than 1 dB at all relevant wavelengths in the optical delay line circuit filter's spectral range.

20. A method as claimed in claim 16, wherein step (a) comprises a selection of an arbitrary set of filter coefficients defining an arbitrary start filter function.

21. A method as claimed in claims 16, wherein step (a) comprises a set of filter coefficients defining a currently implemented filter function in an operating optical delay line circuit filter.

22. A method as claimed in claim 16, wherein step (a) comprises calculating the start filter function filter coefficients from a set of recurrent equations.

23. A method as claimed in claim 16, wherein the filter coefficients of the intermediate and target filter functions of steps (b) and (c) are derived from a measured frequency response curve of an operating optical delay line circuit filter or from a mathematical model of the optical delay line circuit filter.

24. A method as claimed in claim 16, wherein the differences between values of said start filter function and said target filter function at any given wavelength in the filter's spectral range are interpolated linearly to establish the m−1 intermediate filter functions.

25. A method as claimed in claim 16, wherein the optimization of step (c) comprises utilizing a non-linear least squares estimation function to determine a best fit solution.

26. A method as claimed in claim 25, wherein the optimization process comprises a Gauss-Newton or Levenberg-Marquardt algorithm.

27. A method as claimed in claim 26, further comprising a step of maintaining optimized filter coefficients within their respective physical boundaries.

28. A method as claimed in claim 27, wherein the step of maintaining optimized filter coefficients within their respective physical boundaries comprises adding a penalty function to the non-linear least squares estimation function.

29. A method as claimed in claim 27, wherein the penalty function is chosen to have a zero or constant value for filter coefficients residing within their respective physical ranges or within pre-defined inner boundaries of said respective physical ranges and an increased value for filter coefficients outside said ranges.

30. A method as claimed in claim 27, wherein the step of maintaining optimized filter coefficients within their respective physical boundaries comprises a slide back process to place the value of a filter coefficient at the value of a boundary of the physical range or at a value in between the boundaries of the physical range of that that filter coefficient has crossed.

31. A method as claimed in claim 30, wherein the slide back process is applied to only delay line filter coefficients.

* * * * *